United States Patent [19]

Goheen et al.

[11] Patent Number: 4,915,930

[45] Date of Patent: Apr. 10, 1990

[54] PROCESS FOR PRODUCING ALUMINUM HYDROXIDE OF IMPROVED WHITENESS

[75] Inventors: Richard H. Goheen; William A. Nigro, both of Benton, Ark.; Paul J. The, Murrysville, Pa.

[73] Assignee: Aluminum Company of America, Pittsburgh, Pa.

[21] Appl. No.: 275,683

[22] Filed: Nov. 23, 1988

Related U.S. Application Data

[63] Continuation of Ser. No. 891,751, Jul. 31, 1986, abandoned.

[51] Int. Cl.$^4$ ................................................ C01F 7/02
[52] U.S. Cl. .................................... 423/629; 423/111;
    423/112; 423/122; 423/600; 501/153; 106/442;
    106/488; 502/25; 502/415
[58] Field of Search ............... 423/112, 111, 122, 600,
    423/629; 501/153; 106/442, 488; 502/25, 415

[56] References Cited

U.S. PATENT DOCUMENTS

| | | | |
|---|---|---|---|
| 3,796,789 | 3/1974 | Adams | 423/629 |
| 4,046,855 | 9/1977 | Schepers et al. | 423/600 |
| 4,049,773 | 9/1977 | Mejdell et al. | 423/629 |
| 4,465,566 | 8/1984 | Loutfy et al. | 423/112 |

FOREIGN PATENT DOCUMENTS

| | | | |
|---|---|---|---|
| 0092028 | 2/1983 | European Pat. Off. | |
| 0121043 | 1/1984 | European Pat. Off. | 423/600 |
| 51-130698 | 4/1976 | Japan | 423/629 |
| 57-732082 | 6/1982 | Japan | 423/629 |
| 57-31527 | 7/1982 | Japan | 423/629 |
| 9102819 | 6/1984 | Japan | 423/629 |
| 468888 | 4/1975 | U.S.S.R. | 423/122 |
| 400984 | 11/1933 | United Kingdom | 423/629 |

OTHER PUBLICATIONS

ACS Monograph 184, "Industrial Alumina Chemicals" Misra, Washington, D.C. 1986.

Primary Examiner—Robert L. Stoll
Assistant Examiner—Paige C. Harvey
Attorney, Agent, or Firm—Daniel A. Sullivan, Jr.

[57] ABSTRACT

A process for producing aluminum hydroxide including the steps of:
(a) dissolving colorant-containing aluminum hydroxide for forming a solution;
(b) treating the solution for collecting colorant into solid phase material;
(c) separating the solid phase material from the solution; and
(d) precipitating aluminum hydroxide of improved whiteness from the solution.

29 Claims, 2 Drawing Sheets

PROCESS FOR PRODUCING ALUMINUM HYDROXIDE OF IMPROVED WHITENESS

This is a continuation of co-pending application Ser. No. 06/891,751 filed on July 31, 1986 abandoned.

TECHNICAL FIELD

This invention relates to a process for producing white aluminum hydroxide, also known as white hydrate..

BACKGROUND ART

It is known to produce white aluminum hydroxide, for instance with a minimum 93% brightness (based upon a 100% $TiO_2$ reference standard), by a sinter process wherein wet red mud or bauxite is mixed with lime and soda to form a thick slurry. The slurry is sintered to form a soda-lime sinter product composed of insoluble silicate and a soluble aluminate.

U.S. Pat. No. 3,796,789 is an example of such procedure. The soda-lime sinter product, in which most of the color imparting organic compounds have been removed by the sinter process, is leached, and the leachate subjected to a digestion process. The liquor coming from the digestion is then treated with slaked lime for lowering iron.

DISCLOSURE OF THE INVENTION

It is an object of the invention to provide an effective and economical recrystallization-type purification process for producing white aluminum hydroxide. Such white aluminum hydroxide is described in the section Normal-Grade White Hydroxide at pages 42-3 in American Chemical Society Monograph 184, "Industrial Alumina Chemicals", by Chanakya Misra (Wash., D.C., 1986).

While recrystallization is a generally known technique for purification, it is known to have been reported in the literature in the case of aluminum hydroxide. U.S. Pat. No. 4,465,566 shows the purification of aluminum chloride hexahydrate by dissolution in pure HCl liquor.

An experiment somewhat analogous to the recrystallization in 4,465,566 but for the case of aluminum hydroxide led to a brightness of only 86% in the recrystallized aluminum hydroxide. The analogy lay in the use of pure sodium hydroxide solution as the equivalent of the pure HCl liquor. Experimental details were digestion in an autoclave at 143° C. in a 2.5 molar NaOH solution of sufficient aluminum hydroxide of about 70% brightness to produce saturation at that temperature, followed by seeding and reprecipitation at 74° C.

The above object and other objects, which will become apparent in the discussion which follows, are achieved by a process for producing aluminum hydroxide comprising the steps of:

(a) dissolving colorant-containing aluminum hydroxide for forming a solution;

(b) treating the solution for collecting colorant into solid phase material;

(c) separating the solid phase material from the solution; and (d) precipitating aluminum hydroxide of improved whiteness from the solution.

Suitable solid phase material for step (b) include calcium magnesium compounds. Suitable examples of calcium compound are calcium carbonates and a calcium oxides. Both mineral and chemical product forms may be used. Tricalcium aluminate is a preferred calcium oxide compound. Calcium compound alone does not provide as much colorant collecting ability as does a mixture of calcium compound and magnesium compound, while magnesium compound alone leads to increased expense.

Suitable examples of magnesium compound are magnesium sulfates and magnesium oxides. U.S. Pat. No. 4,046,855 of Sheppers et al. discloses magnesium sulfate, chloride, and nitrate compounds which are though to be suitable. European Patent Application Publication No. 92,208 of Pohland et al. gives examples of reactive magnesium oxide and magnesium hydroxide which should be suitable. Both mineral and chemical product forms may be used. Hydrotalcite is a preferred magnesium oxide compound.

Preferred ranges for calcium compound and magnesium compound, expressed as CaO and MgO, are 1 to 5% and 0.05 to 1.0% respectively. All percentages herein are on a weight basis, unless specifically noted otherwise.

More preferably, the calcium is in the range 2 to 3%, while magnesium is in the range 0.2 to 0.3%.

The calcium and magnesium compounds are preferably added while the solution is in the temperature range of 90° to 110° C.

MODES FOR CARRYING OUT THE INVENTION

Color in impure aluminum hydroxide is known to be caused by colorant impurities present in the aluminum hydroxide at concentration levels less than 1%, and even less than 0.5% or 0.25%.

The addition of a mixture of tricalcium aluminate, $3CaO.Al_2O_3.6H_2O$, and hydrotalcite, $6MgO.Al_2O_3.CO_2.12H_2O$, to a sodium aluminate liquor obtained by redigesting impure aluminum hydroxide in sodium hydroxide solution is very effective for decreasing the iron concentration as well as the color imparting organic matter in the liquor. Subsequent reprecipitation results in the production of bright aluminum hydroxide with lowered iron content.

Figure 2:
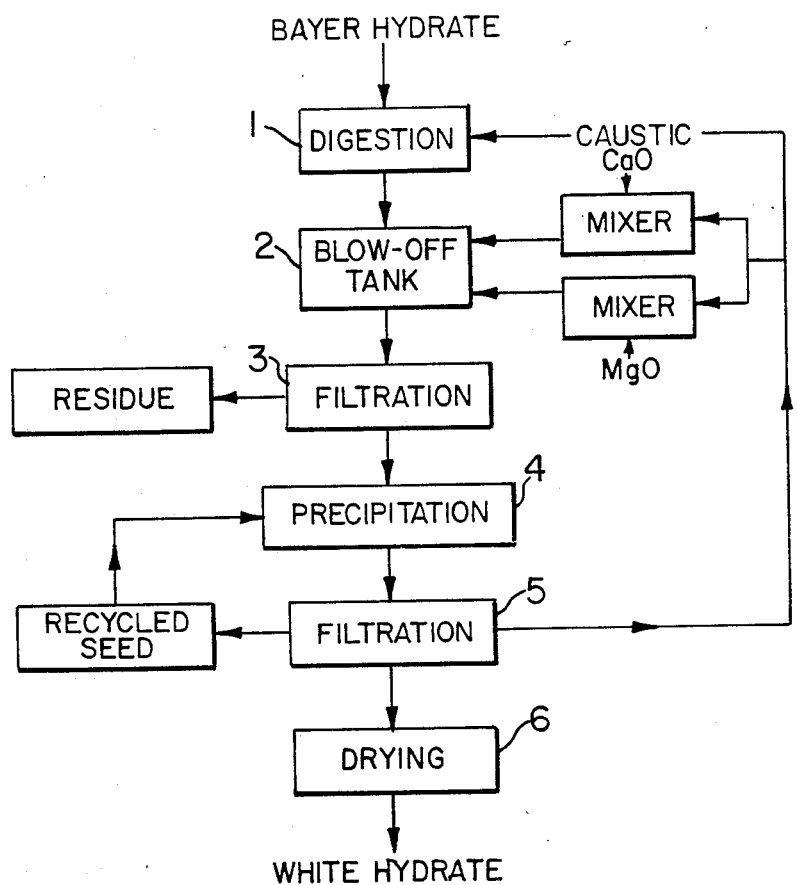

The tricalcium aluminate (TCA) and hydrotalcite (HT) may be prepared by slaking, respectively, calcium oxide and activated magnesium oxide in sodium aluminate spent liquor, i.e. process liquor after the aluminum hydroxide precipitation step. Such spent liquor typically will contain sodium carbonate for supplying the $CO_2$ in the hydrotalcite formula. This process variant is shown in FIG. 2.

Activated magnesium oxide may be made by calcining $MgCO_3$ at 600° C. for one hour. An 800° C. calcining temperature is too high, it rendering the MgO less reactive, while 400° C. is generally insufficient to provide sufficient reactivity.

It is postulated that the mixture of TCA and HT, when added to redigested aluminum hydroxide solution, promotes the destabilization of supersaturated sodium ferrate or the finely colloidal iron particles to form larger iron aggregate which may then be removed, along with color-imparting organic matter presumably sorbed on the TCA and HT, by a separation process such as filtration.

Illustrative application of the invention will now be described by way of example with reference to the accompanying drawing.

Figure 1:
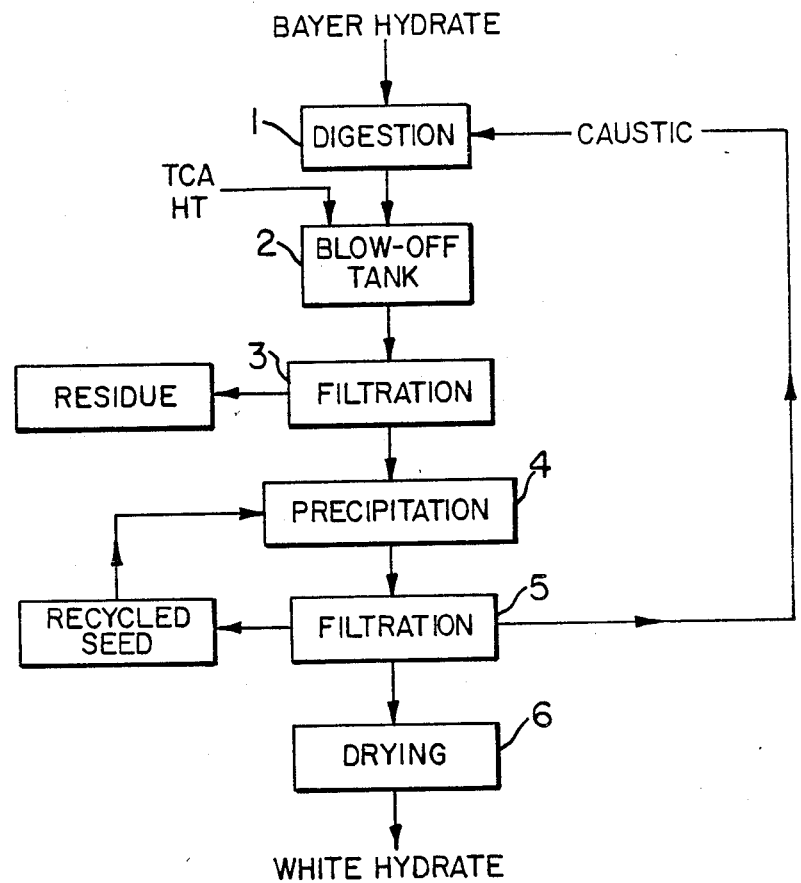
FIGS. 1 and 2 are flow diagrams of processes according to the invention.

In FIGS. 1 and 2, sodium aluminate liquor with the composition shown in Table I was fed to the digester 1, an autoclave, to digest a gibbsitic aluminum trihydroxide, Al(OH)3, of impurity content and brightness as given in Table II. This Al(OH)3 was produced in a Bayer process according to FIG. 3.1A, short of the calcination step, at page 34 in the Monograph 184 cited above in the Disclosure of the Invention. It is also known as "Bayer hydrate". Sufficient aluminum hydroxide was charged to the digester to produce a supersaturated solution. Digestion was conducted at 143° C. for 10 minutes. In Table I, total caustic soda (TC) is the amount of sodium hydroxide present, expressed on a sodium carbonate basis. To determine the number of grams of sodium hydroxide present per liter, one must multiply by twice the molecular weight of sodium hydroxide and divide by the molecular weight of sodium carbonate. This means there were 169.9×80 / 106=128.2 g/L NaOH present. Total alkali (TA) is the amount of NaOH+the amount of Na2CO3. Thus, there were 221.5−169.9=51.6 g/L sodium carbonate present in the digestion.

After digestion, the contents of digester 1 were discharged to blow-off tank 2, where the pressure is reduced to atmospheric pressure. Temperature falls to somewhat above 100° C., in the range 100°to 110° C., as determined by the boiling point rise effect of the dissolved chemicals such as sodium hydroxide. Further heat loss brought the temperature to 95° C., which temperature was maintained.

Varying amounts of tricalcium aluminate (TCA) and hydrotalcite (HT) of compositions as set forth in Tables III and IV were added, as set forth in Tables V to VII, to the blow-off liquor in tank 2 and kept there under continuous mixing for a residence time of 1 hour, or less, to remove the colorants iron and color-imparting organic compounds. In Tables III and IV, LOF stands for "loss on fusion", which essentially represents the chemically combined water and CO2 contents of the chemicals. LOF is determined by mixing 1 gram of sample with 6 grams of lithium borate, Li2B4O7, microwave drying for 5 minutes to drive off sorbed water and gases, weighing for initial dry weight, heating at 600° C. for 4 minutes and at 1100° C. for 16 minutes, and weighing for final weight. An adjustment for lithium borate loss is made. Change in sample weight divided by initial sample weight gives LOF.

In FIG. 1, TCA and HT from any arbitrary source are charged to the blow-off tank, while in FIG. 2 they are manufactured as a part of the process stream as above described.

Following the 1 hour residence time, filtration was performed in filter 3 using No. 4 Whatman paper. To improve the economics of the process, a portion of the filter cake residue can be recycled to digester 1 and blow-off tank 2. In the experiments of Tables V to VII, about 10% of the residue was discarded, while the remaining 90% was recycled to digester 1. To compensate for the 10% discard, 10% new TCA, HT was also added to blow-off tank 2.

The filtered liquor was brought to precipitation temperature of 74° C., seeded with recycled gibbsitic aluminum hydroxide seed, and precipitated in precipitation tank 4 for 40 hours.

It is in the aspect of recycle for seeding and the recycle of caustic liquor filtrate as shown in FIG. 1 where the advantage of combining calcium and magnesium particularly shows up. With extended recycle operation, the aluminum hydroxide product stays whiter (as measured by brightness) longer when feeding both chemicals as contrasted with feeding just calcium compound.

Product aluminum hydroxide was filtered in filter 5 using No. 4 Whatman paper, washed, dried in dryer 6, and submitted for treating. The product has a chemical formula of Al(OH)3 and a gibbsite crystal structure. Further properties are given in Tables V to VII. The median particle size (PM) was determined in a Microtrac Particle Size Analyzer.

As shown in Table V to VII, the addition of mixtures of TCA and HT in the amount of, respectively 2.5 g/L as CaO and varying amounts ranging from 0.15 to 0.6 g/L as MgO to sodium aluminate liquor obtained by redigesting aluminum hydroxide produces higher quality of aluminum hydroxide with an average brightness of about 94.5% (reference of 100% for TiO2 standard) and an average iron content of about 0.004% as Fe2O3. Average median particle size is about 44 microns.

Tables I and VIII give the analyses of, respectively, the liquor and the seed used in cycles, or examples, 1A, 1B and 1C in Tables V to VII. Each subsequent cycle used liquor and seed from its preceding cycle, as shown, respectively, by the recycle of caustic liquor from filter 5 to digester 1 and the recycle of seed from filter 5 to precipitator 4.

Determination of the ability of the calcium-magnesium treatment to remove color-imparting organic compounds was done colorimetrically on filtered blow-off tank solution before and after treatment. Liquor color was measured colorimetrically by the light absorbance of the liquor samples using a Bausch & Lomb spectrophotometer model Spectronic 2000 at a wavelength of 435 nm with a reference of zero for distilled water. The decrease in humate or the color-imparting organic compounds was observed by the change in the absorbance of the liquors from 0.3 to 0.1. This corresponds to a percentage decrease of organic chemicals from around 0.04% for aluminum hydroxide as in Table II to about 0.01% for the products in Tables V to VII.

Significantly, this technique has demonstrated the capability of the addition of TCA and HT to sodium aluminate liquor obtained from the redigestion of Bayer alumina, to produce high quality white aluminum hydroxide with higher brightness and lower iron content.

Brightness herein was measured using a Brightimeter Model S-4 Brightness manufactured by Technidyne Corp.

TABLE I

Composition of Start Liquor.

| | g/L |
|---|---|
| Al2O3 | 51.6 |
| Total Caustic Soda (TC) | 169.9 |
| Total Alkali (TA) | 221.5 |

TABLE II

Impurity Contents of Bayer Aluminum Hydroxide, Inductively Coupled Plasma Analysis:

| | % Composition |
|---|---|
| SiO2 | 0.011 |
| Fe2O3 | 0.008 |

TABLE II-continued

Impurity Contents of Bayer Aluminum Hydroxide, Inductively Coupled Plasma Analysis:

| | % Composition |
|---|---|
| Na2O | 0.33 |
| CaO | 0.014 |
| MgO | 0 |
| % Brightness | 71.0 |

TABLE III

Analysis of Tricalcium Aluminate.

| | % Composition |
|---|---|
| SiO2 | 0.16 |
| Fe2O3 | 0 |
| TiO2 | 0.01 |
| Al2O3 | 24.5 |
| Na2O | 7.22 |
| CaO | 35.2 |
| MgO | 0.2 |
| LOF | 32.7 |

TABLE IV

Analysis of Hydrotalcite.

| | % Composition |
|---|---|
| SiO2 | 0.12 |
| Fe2O3 | 0.09 |
| TiO2 | 0.03 |
| Al2O3 | 15.8 |
| Na2O | 7.96 |
| CaO | 2.29 |
| MgO | 40.8 |
| LOF | 32.9 |

TABLE V

Aluminum Hydroxide Redigestion Data (A).

| Cycle # | 1A | 2A | 3A | 4A | 5A | 6A | Avg. |
|---|---|---|---|---|---|---|---|
| Additive: | | | | | | | |
| TCA, g/L (1) | 2.5 | 2.5 | 2.5 | 2.5 | 2.5 | 2.5 | |
| HT, g/L (2) | 0.6 | 0.6 | 0.6 | 0.6 | 0.6 | 0.6 | |
| Res. Time, hr. | 1 | 1 | 1 | 1 | 1 | 1 | |
| Temp. °C. | 95 | 95 | 95 | 95 | 95 | 95 | |
| Prod. Alum. Hydroxide, | | | | | | | |
| % SiO2 | 0.001 | 0.001 | 0.001 | 0.001 | 0 | 0.001 | 0.001 |
| Fe2O3 | 0.004 | 0.004 | 0.004 | 0.004 | 0.003 | 0.005 | 0.004 |
| CaO | 0.016 | 0.027 | 0.025 | 0.021 | 0.016 | 0.017 | 0.020 |
| MgO | 0.002 | 0.004 | 0.003 | 0.002 | 0.002 | 0.002 | 0.002 |
| Na2O | 0.16 | 0.22 | 0.020 | 0.27 | 0.23 | 0.21 | 0.21 |
| Part. size, PM, μm | 33 | 38 | 42 | 46 | 49 | 51 | 43 |
| Brightness, (3) | 95.5 | 95.1 | 95.0 | 94.4 | 94.4 | 94.4 | 94.8 |

(1) Tricalcium aluminate, expressed as CaO equivalent.
(2) Hydrotalcite, expressed as MgO equivalent.
(3) Reference: 100% for TiO2 standard.

TABLE VI

Aluminum Hydroxide Redigestion Data (B).

| Cycle # | 1B | 2B | 3B | 4B | 5B | 6B | Avg. |
|---|---|---|---|---|---|---|---|
| Additive: | | | | | | | |
| TCA, g/L(1) | 2.5 | 2.5 | 2.5 | 2.5 | 2.5 | 2.5 | |
| HT, g/L(2) | 0.3 | 0.3 | 0.3 | 0.3 | 0.3 | 0.3 | |
| Res. Time, hr. | 1 | 1 | 1 | 1 | 1 | 1 | |
| Temp. °C. | 95 | 95 | 95 | 95 | 95 | 95 | |
| Prod. Alum. Hydroxide, | | | | | | | |
| % SiO2 | 0.002 | 0.003 | 0.001 | 0.001 | 0 | 0.001 | 0.001 |
| Fe2O3 | 0.004 | 0.004 | 0.006 | 0.004 | 0.004 | 0.003 | 0.004 |
| CaO | 0.016 | 0.016 | 0.015 | 0.019 | 0.016 | 0.016 | 0.016 |
| MgO | 0.002 | 0.002 | 0.001 | 0.001 | 0.001 | 0.001 | 0.001 |
| Na2O | 0.17 | 0.18 | 0.16 | 0.22 | 0.17 | 0.21 | 0.18 |
| Part. size, PM, μm | 35 | 40 | 48 | 51 | 53 | 58 | 48 |
| Brightness (3) | 95.3 | 95.1 | 95.0 | 93.9 | 94.1 | 93.9 | 94.5 |

(1) Tricalcium aluminate, expressed as CaO equivalent.
(2) Hydrotalcite, expressed as MgO equivalent.
(3) Reference: 100% for TiO2 standard.

TABLE VII

Aluminum Hydroxide Redigestion Data (C).

| Cycle # | 1C | 2C | 3C | 4C | 5C | 6C | Avg. |
|---|---|---|---|---|---|---|---|
| Additive: | | | | | | | |
| TCA, g/L(1) | 2.5 | 2.5 | 2.5 | 2.5 | 2.5 | 2.5 | |
| HT, g/L(2) | 0.15 | 0.15 | 0.15 | 0.15 | 0.15 | 0.15 | |
| Res. Time, hr. | 1 | 1 | 1 | 1 | 1 | 1 | |

TABLE VII-continued

| | Aluminum Hydroxide Redigestion Data (C). | | | | | | |
|---|---|---|---|---|---|---|---|
| Cycle # | 1C | 2C | 3C | 4C | 5C | 6C | Avg. |
| Temp. °C. | 95 | 95 | 95 | 95 | 95 | 95 | |
| Prod. Alum. Hydroxide, | | | | | | | |
| % SiO2 | 0.001 | 0.003 | 0.001 | 0.002 | 0 | 0.001 | 0.001 |
| Fe2O3 | 0.004 | 0.005 | 0.004 | 0.003 | 0.004 | 0.003 | 0.004 |
| CaO | 0.017 | 0.015 | 0.015 | 0.015 | 0.014 | 0.015 | 0.015 |
| MgO | 0.002 | 0.001 | 0.001 | 0.001 | 0.001 | 0.001 | 0.001 |
| Na2O | 0.17 | 0.19 | 0.21 | 0.22 | 0.18 | 0.20 | 0.19 |
| Part. size, PM, μm | 32 | 38 | 41 | 42 | 48 | 52 | 42 |
| Brightness (3) | 95.3 | 95.1 | 95.4 | 94.8 | 95.0 | 94.5 | 95.0 |

(1) Tricalcium aluminate, expressed as CaO equivalent.
(2) Hydrotalcite, expressed as MgO equivalent.
(3) Reference: 100% for TiO2 standard.

TABLE VIII

| Impurities Contents of Initial Seed Aluminum Hydroxide. Inductively Coupled Plasma Analysis. | |
|---|---|
| | % Composition. |
| SiO2 | 0.002 |
| Fe2O3 | 0.004 |
| CaO | 0.011 |
| MgO | 0.001 |
| Na2O | 0.24 |
| Part. size, PM, μm | 30 |
| Brightness | 93.4 |

We claim:

1. A process for producing aluminum hydroxide comprising the steps of:
   (a) dissolving colorant-containing aluminum hydroxide in a sodium-hydroxide-containing, aqueous medium to form a solution;
   (b) treating the solution with solid phase material comprising tricalcium aluminate and hydrotalcite to collect colorant into said solid phase material;
   (c) separating said solid phase material with colorant collected therewith from the solution; and
   (d) precipitating aluminum hydroxide of improved whiteness from the solution as compared to the starting aluminum hydroxide 2. A process as set forth in claim 1 wherein the colorant-containing aluminum hydroxide contains less than 1% by weight of colorant.

3. A process as set forth in claim 2 wherein the colorant-containing aluminum hydroxide contains less than 0.5% by weight of colorant.

4. A process as set forth in claim 1, the process being run in recycle operation wherein a portion of the aluminum hydroxide precipitated in step (d) is recycled for supply of seed for step (d) and solution from which aluminum hydroxide has been precipitated in step (d) is recycled to step (a) for supply of sodium-hydroxide-containing, aqueous medium.

5. A process as set forth in claim 1 wherein the aluminum hydroxide precipitated from the solution has an iron content of less than 0.007% by weight and a brightness of greater than 93% based upon a 100% TiO2 reference standard.

6. A process for producing aluminum hydroxide having an iron content of less than 0.007% by weight and a brightness of greater than 93% based upon a 100% TiO2 reference standard, said process comprising the steps of:
   (a) dissolving in a sodium-hydroxide-containing, aqueous medium aluminum hydroxide contaminated with colorant including iron to form a solution;
   (b) treating the solution with a mixture containing both tricalcium aluminate and hydrotalcite in amounts effective for collecting colorant including iron;
   (c) separating from the solution the tricalcium aluminate and hydrotalcite with colorant collected therewith; and
   (d) precipitating aluminum hydroxide from the solution.

7. A process as set forth in claim 6 wherein solution temperature during treatment in step (b) is in the range 90° to 110°C.

8. A process as set forth in claim 6 further comprising the step of seeding the solution with aluminum hydroxide prior to precipitating the aluminum hydroxide from the solution.

9. A process as set forth in claim 6 wherein aluminum hydroxide precipitates from the solution at a temperature between about 60°-80° C. (140°-176° F.).

10. A process as set forth in claim 9 wherein aluminum hydroxide precipitates from the solution at a temperature of about 74° C. (165° F.).

11. A process for lowering the content of colorant including iron in contaminated aluminum hydroxide, said process comprising the steps of:
   (a) dissolving in a sodium-hydroxide-containing, aqueous medium contaminated aluminum hydroxide to form a solution;
   (b) treating the solution with a mixture containing both tricalcium aluminate and hydrotalcite in sufficient amounts effective for collecting colorant including iron;
   (c) separating from the solution tricalcium aluminate and hydrotalcite with colorant collected therewith; and
   (d) precipitating aluminum hydroxide having a lower content of colorant including iron from the solution.

12. A process set forth in claim 4 further comprising the step of seeding the solution with additional aluminum hydroxide prior to precipitating the aluminum hydroxide from the solution.

13. A process set forth in claim 11 wherein aluminum hydroxide precipitates from the solution at a temperature between about 60°-80° C. (140°-176° F.).

14. A process set forth in claim 13 wherein aluminum hydroxide precipitates from the solution at a temperature of about 74° C. (165° F.).

15. A process as set forth in claim 11 wherein aluminum hydroxide precipitated has an iron content of less than 0.007% by weight and a brightness of greater than 93% based upon a 100% $TiO_2$ reference standard.

16. A process as set forth in claim 1 wherein at least a portion of at least one of said tricalcium aluminate and hydrotalcite is formed by reaction of CaO or MgO with solution from which aluminum hydroxide has been precipitated in step (d).

17. A process as set forth in claim 1 wherein solution temperature during treatment in step (b) is in the range 90° to 110° C.

18. A process as set forth in claim 6, wherein at least a portion of at least one of said tricalcium aluminate and hydrotalcite is formed by reaction of CaO or MgO with solution from which aluminum hydroxide has been precipitated in step (d).

19. A process as set forth in claim 11 wherein solution temperature during treatment in step (b) is in the range 90° to 110° C.

20. A process as set forth in claim 11 wherein at least a portion of at least one of said tricalcium aluminate and hydrotalcite is formed by reaction of CaO or MgO with solution from which aluminum hydroxide has been precipitated in step (d).

21. A process as set forth in claims 1, 6, or 11 wherein humates are separated with said solid phase material in step (c).

22. A process as set forth in claim 1 wherein about 10% of the solid phase material separated in step (c) is discarded and about 90% is recycled to step (b).

23. A process as set forth in claim 6 wherein a minor portion of tricalcium aluminate and hydrotalcite separated in step (c) is discarded and a major portion is recycled to step (b).

24. A process as set forth in claim 23 wherein said minor portion is about 10% and said major portion is about 90%.

25. A process as set forth in claim 11 wherein a minor portion of the tricalcium aluminate and hydrotalcite separated in step (c) is discarded and a major portion is recycled to step (b).

26. A process as set forth in claim 25 wherein said minor portion is about 10% and said major portion is about 90%.

27. A process as set forth in claim 1, 6, or 11 wherein a portion of the aluminum hydroxide precipitated in step (d) is recycled for supply of seed for step (d).

28. A process as set forth in claim 1, 6, or 11 wherein solution from which aluminum hydroxide has been precipitated in step (d) is recycled to step (a) for supply of sodium-hydroxide-containing, aqueous medium.

29. A process for producing aluminum hydroxide comprising the steps of:
 (a) dissolving colorant-containing aluminum hydroxide in a sodium-hydroxide-containing, aqueous medium to form a solution;
 (b) treating the solution with solid phase material comprising tricalcium aluminate and hydrotalcite to collect colorant into said solid phase material;
 (c) separating said solid phase material with colorant collected therewith from the solution;
 (d) precipitating aluminum hydroxide of improved whiteness from the solution as compared to the starting aluminum hydroxide, and
 (e) preparing at least a portion of at least one of said tricalcium aluminate and hydrotalcite for use in step (b) by reaction of CaO or MgO with sodium aluminate liquor.

* * * * *

UNITED STATES PATENT AND TRADEMARK OFFICE
CERTIFICATE OF CORRECTION

PATENT NO.   : 4,915,930
DATED        : April 10, 1990
INVENTOR(S)  : Richard H. Goheen et al It is certified that error appears in the above-identified patent and that said Letters Patent is hereby corrected as shown below:

| | |
|---|---|
| Col. 1, line 39 | After "it is" insert --not--. |
| Col. 2, line 10 | Change "though" to --thought--. |
| Col. 2, line 12 | Change "92,208" to --92,028--. |
| Col. 4, line 11 | Change "treating" to --testing--. |
| Col. 6, table 5 | Change "Avc." to --Avg.--. |
| Col. 6, table 5 | Row Na2O, col. 3A, Change "0.020" to --0.20--. |
| Col. 8, line 62 Claim 12 | Change "A process set forth in claim 4" to --A process as set forth in claim 11--. |
| Col. 8, line 66 Claim 13 | After "process" insert --as--. |
| Col. 9, line 1 Claim 14 | After "process" insert --as--. |

Signed and Sealed this

Nineteenth Day of November, 1991

Attest:

HARRY F. MANBECK, JR.

Attesting Officer

Commissioner of Patents and Trademarks